United States Patent Office 3,158,993
Patented Dec. 1, 1964

3,158,993
SOLID FUELS AND FORMULATIONS
James E. Hodgson, Cleveland, Ohio, assignor to Solid Fuels Corporation, Cleveland, Ohio, a corporation of Ohio
No Drawing. Filed Feb. 18, 1959, Ser. No. 849,130
19 Claims. (Cl. 60—35.4)

The present invention is directed to a solid fuel having finely divided guel particles bound within a metallic or metalloid matrix, and more particularly metal-containing fuel particles bound within a matrix of a relatively low melting metal which is preferably lithium.

It is an object of the present invention to provide a solid fuel which is capable of delivering a large amount of energy.

It is an object of the present invention to provide a solid slug which is steam reactive and capable of delivering a high specific impulse.

It is an object of the present invention to provide a method of making an improved solid fuel by mixing a powdered metal such as lithium having a low melting point and a powdered metal hydride such as lithium hydride, heating the mixture and thereafter pressing or extruding the heated powder mixture and to shape to form a solid fuel slug in which the metal hydride particles are bound together by lithium.

I, the inventor, claim the discovery and evaluation of the following systems of hybrid engines and propellant and combustion systems and the methods of compounding and formulating the fuels and oxidizers specified in the following text. The applications of these combustion systems, to auxiliary power units for civil and military equipment including airborne, space, marine and underwater missiles and vehicles, including rocket engines, combustion chambers and processes, together with ramjet and rocket ramjet application.

The system of burning solid fuel placed in "situ" with a liquid oxidizer. The injection of solid fuels by any and all means into a combustion chamber for reaction with a liquid oxidizer.

The combustion of solid oxidizer in "situ" with any liquid fuel or oxygen short monopropellant or monopropellant mixture or solution.

The combustion of an injected solid oxidizer for reaction with any liquid fuel or oxygen short monopropellant or monopropellant mixture or solution.

The combustion of integrated in "situ" and fused injection of solid fuels and oxidizers as above with combustion initiation and/or maintenance with a liquid propellant or monopropellant or monopropellant mixture or solution. The applications of these to all airborne space and marine applications for rocket and combustion chamber applications.

For their application to the Mauu and all types of integrated rocket ramjet engines where rocket operation is applied to ramjet engines for take off and land operations and where conventional liquid bipropellant systems can replace those listed above.

Also the application of certain of the hydrogen rich compositions to nuclear rocket propulsion and the method of injecting them into the reactor.

The advantages claimed for solid fuel slugs and hybrid engines are:

A.
(1) Full use can be made of many solid high energy fuel material i.e. beryllium, lithium, boron, aluminum and magnesium hydride, double hydrides, carbides and organo complexes, of these elements.
(2) Hazardous and spontaneously inflammable solid fuels useful for hypersonic ramjet fuels to prevent flame out at extreme altitude and velocity, can be incorporated and stored in safety. The handling of high energy fuels and fueling of missiles is made safe and simpler.
(3) Very high fuel densities are available (B.t.u. cu. ft.) in certain cases, i.e. hypersonic ramjet fuel, 10% lithium binder, 90% boron powder. Density 2.0 and B.t.u. output of 23,000 per lb. Which compared with liquid boron hydride 30,000 B.t.u. per lb. density 0.6. Thus 18,000 B.t.u. unit volume boron hydride and 44,000 B.t.u. unit volume boron lithium mixture. 10% phosporus on 90% boron produces a slug 23,000 B.t.u. Density 2.15 spontaneously inflammable at lowest subsonic flight speeds to the highest supersonic flight speeds.

B. The methods of applying and/or feeding into engines:
(1) Gas pressure feeding, any cool gas source and control.
(2) Hydraulic pressure feeding with sea water by constant volume pump (torpedo).
(3) Screw driven pressuring plate, the screw is driven by engine or auxiliary.
(4) Pressurized as in 1, 2 or 3 and fed into chamber by Archimedean screw pump driven by engine or auxiliaries.

C. Methods of manufacture:
(1) Mixing and casting or extruding.
(2) Sintering impregnation.

D. Formulation for specific application:
Patent claims wherein solid fuel slugs composed of the metals lithium, carbon, beryllium, boron, magnesium, aluminum, their hydrides and double hydrides i.e. lithium boron hydride $LiBH_4$ and in certain instances their carbides combinations using lithium or phosporous as a binder in fusable cases are burned with a variety of oxidizers, solid oxysalts such as lithium chlorate, lithium perchlorate, lithium nitrate, the magnesium and calcium oxysalts of the aforesaid lithium derivatives and ammonium nitrate and chlorate in sea water solution. Free sea water may be burned with certain formulations and any of the well established oxidizers such as hydrogen peroxide, nitric acid, nitrogen oxides, fluorine derivatives, etc., are applicable principally to airborne applications.

(a) The finely divided metals and hydrides are suspended in, or bound with the low melting point metal lithium or in cheaper less efficient binders of sodium or potassium or sodium potassium alloys, or in special cases, yellow phosphorous. That these slugs may be burned in "situ" or pressure fed at the melting point in a variety of ways, at a fuel injection orifice as shown. The method of manufacture is by mixing at the melting point of the binder and extrusion or casting in hydrogen or inert gas atmosphere. The slugs being wrapped for protection in polyethylene tape, or surface coated with suitable resin i.e. methacrylate polystyrene etc.

(b) A similar composition bound in organic resin for combustion in "situ" or fusion injection and is more stable in atmosphere but has lower energy. Thiokol rubber, polyurethane resin, styrene, acrylates, etc., can be used for binding, depending on composition, manufactured as above and polymerized during extrusion. These are suitable for reaction with the highly reactive oxidizers and fluorinating agents, i.e. hydrogen peroxide, chlorine trifluoride.

(c) Sintered powdered alloys of lithium-aluminum; lithium-magnesium; lithium - aluminum - magnesium and/or magnesium; aluminum; boron; carbon; beryllium depending on combustion requirements and of a porosity designed to suit requirements, are vacuum and pressure impregnated with metallic lithium which may carry some finely powdered metaloid hydrides in suspension. Or impregnated with yellow phosporous for lower efficient airborne use.

Sintering technique is in accordance with the established practice as used for making sintered metal filters or porous bearings. These slugs are burned in "situ" only, excellent as simple power boosters when placed in a hydrogen peroxide ($H_2O_2$) decomposition chamber.

EXAMPLES

I. Fuel composition bound with lithium or plastic for fused injection or combustion in "situ." Excellent formula for full oxidation to produce fully condensing exhaust (trackless conditions) for use with hydrogen peroxide ($H_2O_2$) (lithium chlorate, lithium perchlorate, magnesium perchlorate ($LiClO_3$, $LiClO_4$ $MgClO_4$) (sea water) or other nonnitrogeneous oxidizer. (Torpedo or underwater vehicle trackless conditions.)

| Compound | Metal, Hydrogen Ratio | |
|---|---|---|
| Aluminum Hydride ($AlH_3$) 80–90% | 9 | 1 |
| or Lithium Aluminum Hydride ($LiAlH_4$) 80–90% | 8.5 | 1 |
| or Magnesium Hydride ($MgH_2$) 80–90% | 12 | 1 | or any ratio of mixture of these with 10 to 20% finely powdered alloys of lithium-aluminum; li. magnesium lithium-beryllium subject to combustion conditions and bonded with 10–15% metallic lithium gives very favourable metal to hydrogen ratios resulting in lower oxygen requirements i.e. 24 parts magnesium require 16 parts of oxygen for combustion whereas only 2 parts hydrogen require 16 parts oxygen.

II. Excellent formula for non-condensing exhaust conditions with any oxidizer hydrogen peroxide, nitric acid, etc. (lithium chlorate, lithium perchlorate, magnesium perchlorate, magnesium nitrate, lithium nitrate, ammonium nitrate in solution in sea water) the requirement being to oxidize the metal content without the hydrogen content of the fuel. The free hydrogen being a primary propulsive medium formula rich in hydrogen:—Airborne or marine applications.

| Compound | Metal, Hydrogen Ratio | |
|---|---|---|
| (a) Lithium Hydride (LiH) | 7 | 1 |
| Lithium Boro Hydride ($LiBH_4$) | 4 | 1 |
| Decaborane ($B_{10}H_{14}$) | 5 | 1 |
| (b) Lithium Hydride (LiH) | 7 | 1 |
| Lithium Aluminum Hydride ($LiAlH_4$) | 8.5 | 1 |
| (c) Lithium Hydride (LiH) | 7 | 1 |
| Magnesium Hydride ($MgH_2$) | 12 | 1 |

(All these materials singly or in any ratio or mixture.)

all bound with 10–15% lithium and containing free metals and alloys as above can be bonded with plastic or phosphorus for hydrogen peroxide reaction.

III. Excellent formula for reacting with sea water with small concentration of dissolved oxidizers for ignition and combustion maintenance.

Lithium hydride (LiH)
Lithium aluminum hydride ($LiAlH_4$)
Aluminum hydride ($AlH_3$)
Magnesium hydride ($MgH_2$)
(All and any of these in any ratio or mixtures.)
(No free metals.)

bond with 10–15% lithium or lower energy sodium or potassium or sodium potassium alloy. (Marine applications.)

IV. Ramjet fuel.
Boron 80–90% or aluminum 80–90% bonded with 10–20% lithium or yellow phosphorous.

(Lithium hydride can be added in any percentage as dispersal medium.)

V. Sintered fuel slugs (for burning "situ"): These are designed in composition to suit requirements of fast or slow combustion. Sintered slugs burn in decomposing hydrogen peroxide in this order of decreasing rapidity, for marine and airborne applications.

Magnesium aluminum lithium alloys (high lithium)
Magnesium lithium alloy (high lithium)
Aluminum lithium alloy (high lithium)
Magnesium
Beryllium
Aluminum magnesium
Aluminum
Boron carbon, boron carbide, boron silicide (I.e. lithium hydride M.P. 680° can be incorporated in any and all aluminum or magnesium or other alloys with melting points below 680°. As powdered metals and alloys in any and all ratios and mixtures suitable for the application sintered with any and all applicable ratios of their hydrides, carbides and borides in solid or porous forms for impregnation.) (Lithium or phosphorus impregnation to suit application. Magnesium is used for marine applications only. Phosphorus is used in airborne applications only except when full oxidization is used and it should be kept below 20 percent by weight of fuel because of inferior performance; it provides excellent and reliable ignition characteristics in air. The addition of a little copper, 0.5%, improves combustion characteristics of the sintered materials.)

The metal powders, free from oxides and impurities are taken in suitable grain size and are compacted into the form required with or without a hydride blowing agent. The slug is then sintered in a hydrogen atmosphere. The slug is transferred to a vessel at the temperature of impregnation (200° C.–250° C. for metallic lithium; 60° C. for phosphorus and 10% above the melting point of sodium, potassium or whatever alloy is used for impregnation.)

The vessel is exhausted for some minutes to remove gases from the slug. The molten impregnant is admitted to cover the slug and the vessel is pressured with hydrogen gas to whatever is required to impregnate the slug. When the pore structure of the slug is sufficiently coarse and required, up to 10% of lithium hydride or other hydride finely powdered may be suspended in the lithium impregnant to improve combustion characteristics. After impregnation which takes from one to ten hours depending on pore and slug dimensions, the vessel is drained and the slug cooled, removed and immediately surface treated with polyethylene or polystyrene tape or aluminum foil for protection against oxidation in storage.

*Combustion of Fuel Slug*

Fusible Fuel Slugs may be pressurized and fusion fed into the simple engine system or into the more elaborate long "stay time" engine system. They may also be burned under certain circumstances in "situ" in the simple engines systems. They are only suitable for "in situ" burning at low temperatures and short duration engines with good regenerative cooling. For long burning times, sintered fuel slugs should be used. They are selected to suit the combustion chamber temperatures, exhaust products required and the oxidizer system to be used.

For airborne rocket and rocket-ramjet engine operation (XI), hydrogen peroxide has proven to be the best oxidizer, when liquid oxygen is not available. Thus with the fuels specified above, the fuel-oxidizer ratio is regulated to burn the total oxygen in the hydrogen peroxide molecule to release the hydrogen for propulsion. The only exception to this rule is in torpedo combustion for "trackless" conditions when all hydrogen must be oxidized to produce a condensing exhaust.

A primary patent claim is the use of the low melting point elements and their alloys for binding all ranges and types of fuel substances, compounds and elements for all and any application and including all those common hydrocarbon substances, used for fuels, i.e. coal, bitumen, etc. The elements lithium, phosphorous, sulphur, sodium, potassium, magnesium, aluminum, and calcium and all and any of their alloys and mixtures when used as fuel binders in any and all proportions and mixtures or as pure substances for all and any of the combustion objections.

(1) For fusion and injection into an engine where the combustion chamber heat is used to fuse or decompose the fuel.
(2) For aiding ignition, maintain it or increase the reactivity of a fuel.
(3) For binding highly reactive and more hazardous fuels, to make them handable and safe and more convenient for use, i.e. for insertion into the combustion chamber of a hybrid engine.

The patent claim also applies to the use of the metal hydrides, carbides and borides, in the pure or mixed form or as binders for metallic elements and fuels in any and all proportions for:

(1) Fusion and injection into all and any type of suitable combustion chamber, i.e. aluminum hydride 50%, aluminum powder 50%.
(2) For casting or extrusion and combustion in any and all combustion chambers in "situ" as described before. The metal hydrides can be cast in suitable retaining grids and are applicable to short intense thrust applications. A little plastic binder can be added if indicated, i.e. lithium hydride 50%, metallic boron 50% or sintered boron carbide as combustion resistant combustion chamber liner.

The hydrides of primary interest in this patent are:

Lithium hydride
Decaborane
Aluminum hydride
Magnesium hydride
Magnesium borohydride
Lithium borohydride
Lithium aluminum hydride
Lithium magnesium hydride
Lithium beryllium hydride
Beryllium borohydride and all related solid organo metal compound.

This patent also applies to the application of lithium bound, lithium hydride, solid borohydrides, and ammonium and amine compounds, polymeric hydrocarbons, i.e. polyethylene and organo lithium derivatives for nuclear rocket propulsion and nuclear ramjet "take off" the fuel being injected with fusion under pressure by any and all means into the reactor. That is as a binder for all and any solid fuels used for nuclear propulsion.

*Examples of Fuels for Combustion Systems*

SYSTEM I

A fuel slug is pressure fed with fusion into a combustion chamber and suitable fuels are:
 (a) 20% lithium—binding a mixture of 20% lithium hydride, 60% lithium borohydride or
 (b) 80% aluminum hydride
 (c) 80% lithium aluminum hydride
 (d) 80% magnesium hydride depending on requirements.

All will react with sea water for marine propulsion when pressure injected into the combustion chamber.

SYSTEM II (a) Liquid oxidizers:
Hydrogen peroxide
Chlorine trifluoride
Aqueous solution of lithium chlorate, ammonium nitrate, hydroxylamine nitrate.
Reacted with solid fuels.
 (i) Any and all light metal sintered and impregnated with lithium or phosphorous.
 (ii) Any and all light elements and/or hydrides and carbides bound with lithium, phosphorous aluminum, magnesium or organo plastic, that is
Airborne missile:
 80% boron ⎫
 20% phosphorous ⎬ Hydrogen peroxide.
Marine missile:
 80% lithium aluminum hydride ⎫
 20% lithium ⎬ Ammonium nitrate in aqueous solution.

(b) Solid oxidizer—Liquid fuel:
I.e. solid lithium nitrate reacted with liquid nitro benzene, airborne or marine.

SYSTEM III (a) Solid oxidizer (E) is dissolved in sea water and reacted with solid fuel (L).
 I.e. (i) Lithium Chlorate in sea water reacted with 80% Magnesium Hydride in 20% Lithium.
 (ii) Ammonium Nitrate in sea water reacted with a conventional under oxidized Ammonium nitrate organic resin based solid fuel (fully gaseous exhaust products).
(b) Solid fuel (E) dissolved in sea water reacted with a solid oxidizer for fuel ignition (L) and combustion maintenance.
 I.e. (i) Pelleted Lithium Borohydride in sea water reacts with the water in the combustion chamber using a Lithium Perchlorate or 20% Lithium, 80% Lithium Hydride, etc. (L) slug for ignition and combustion maintenance.

SYSTEM IV

Solid fuel or solid oxidizer system reacted with liquid monopropellant for combustion ignition and maintenance.

I.e. H is _____ Propyl nitrate 10% on (Airborne Rocket)
L or N is _____ Lithium perchlorate and
N or L is _____ 80% Decaborane in 20% Lithium.

SYSTEM V (a) Liquid oxidizer reacted with injected and in "situ" fuel.
Injected oxidizer is water (H)
Injected fuel (N) 80% Lithium Hydride, Borohydride, Aluminum or Magnesium Hydride in 20% Lithium.
In "situ" fuel (L) 30% of Lithium Hydride, in 70% Lithium Magnesium Alloy.
(b) Liquid monopropellant reacted with solid injected oxidizer.

Monopropellant.
(H) nitro benzene 10% or Propyl Nitrate
(N) lithium chlorate
(L) as L or N above

SYSTEM VI

Thermit composition

Lithium Perchlorate _____ 30–59%
50–50 Aluminum— Magnesium _____ 41–70%
(Lithium Perchlorate—Aluminum Theor. Ratio is 59–41%)
Bound with 3% linseed oil, 2 to 10% of sodium oxalate to suit combustion speed requirements.
The thermit composition superheats the sea water taken in over it and reacts it with the excess metal and or the solid slug (L) in the combustion chamber.
 Solid slug (L) is metal hydride bound in lithium. (Marine).

SOLID FUELS—RAMJET ENGINES (1) Solid fuels containing no oxidizer and burned with liquid oxidizers in hybrid engines. The elements lithium, berylium, boron, aluminum, phosporus and magnesium in the form of hydrides, carbides, bonides and the free metals or thin alloys. Also certain lower energy elements like silicone, titanium and titanium hydrides bound with other elements or plastics.

(2) These solid fuels and reactive hydrides and metals bounded with all and any percentages of Lithium or phosporus for fusion and injection into combustion chambers or combustion in "situ" in any and all types of combustion chambers.

(3) Boron carbides and aluminum borides etc., sintered or bound with Aluminum or Boron as combustion resistant, combustion chamber liners for the protection of engines such as ramjets when heavily loaded thermodynamically i.e. when operated as rocket engines for take off.

(4) It is the patent claim that pure combustion resistant fuels of high energy and density, (high density impulse) can be burned with complete control in ram air in the ramjet engine by first combustion conditioning then ram air by heating it to the spontaneously reaction temperature with a liquid fuel. Thus a fuel slug of sintered boron, impregnated with Lithium can be burned in "situ" in ram air preheated to 700° C. with a liquid alkyl boron or conventional fuel. Suitable for aircraft propulsion.

(5) That a fuel slug of powdered aluminum and lithium hydride bound with lithium can be burned in "situ" with hydrogen peroxide for take off and acceleration as a rocket and the engine then changes to ram jet operation and that at speeds above Mach 1.5 that the fuel is spontaneously combustable with ram air. This reaction being suitable for one shot missile propulsion.

By way of summary, the solid fuels of the present invention have many advantages. Some of the advantages along with the inventive concepts are listed below with each advantage or concept set forth in a numbered paragraph:

(1) In accordance with the present invention, solid metalloid fuel slugs are provided for reaction "in situ" in any and all suitable combustion chambers with any and all suitable oxidizing or fluorinating agents including air and water. The fuel can be a mixture of the elements lithium, beryllium, boron, carbon, aluminum, magnesium, silicon, titanium, sodium, potassium, phosphorus and their solid hydrides, carbides, borides, alloys and organo metallic derivatives. Also, the fuel can be a mixture in finely divided form of (a) a binder or stabilizer (b) the primary fuel materials (c) an ignition sensitizer of combustion conditioning agent or both, these being required for starting or maintaining combustion or both.

(2) Another advantage of the present invention is that these mixtures may be also pressure injected, with or without fusion into all and any suitable combustion chambers or boilers for reaction with any and all liquid oxidizers or fluorinating agents in the usual way, or liquid floro carbons, fluoro hydrocarbons, fluoro-nitro-hydrocarbons and fluoroethers and nitro derivatives of these.

(3) The following illustrates fuel substances that can be advantageously used. The materials listed in paragraph 1 above as (a) can be: lithium, phosphorus, magnesium, aluminum, sodium-potassium or alloys of lithium-aluminum-magnesium and any of two additions to improve properties or can be finely divided mixtures of these, pressed and sintered with or without the addition of lithium hydride and the substances listed as above.

(4) Fuel slugs of value can be made where the primary fuel materials listed as (b) can be: boron, beryllium, aluminum, magnesium, lithium, carbon, silicon, titanium and their carbides-borides, hydrides i.e.; decarborane, lithium hydride, boron carbide, lithium boro hydride, lithium aluminum hydride and solid organo metallic derivatives.

(5) Also fuel slugs can be used where (c) can be: decaborane, lithium hydride, phosphorous, lithium, potassium, sodium and the hydrides of the elements 4. Also, the component (c) can be a separate section or sections of conventional solid propellant or thermits or any mixture of fuel and oxidizer encasing or encased in the solid metal and/or metalloid fuels for combustion conditioning especially for reaction with water.

(6) The above described fuel slugs can be used in solid propellant systems invention where the compositions set forth in paragraphs 1, 3, 4, and 5 can be fed with or without fusion into any and all suitable types of combustion chamber and where the propellant contains stoichiometric ratios of oxidizer to fuel or is under oxygenated and the excess oxygen is made up by the conventional injection of all and any liquid oxidizers or fluorinating agents. The feeding of the fuel slugs by fusion is generally meant heating to the melting point of lithium or less, the upper limit being the melting point of lithium hydrides.

(7) Fuel slugs can be advantageously used where components (b) and (c) of paragraph 1 can be lithium hydride, aluminum hydride, magnesium hydride, lithium aluminum hydride, or lithium or beryllium or magnesium borohydride or decaborane or any mixture of these. These mixtures are manufactured by blending the powdered materials dry or in benzene or other low boiling point inert fluid. Then the mixtures are processed by casting, pressing or extruding the mixture to the desired shape or size and drying off the solvent, if included, and then machanically pressing the shape under very high pressure with sintering if composition permits.

(8) These solid fuel slugs are advantageously employed for marine use for reaction with sea water, and/or water solutions of oxysalts, oxyacids, halogens, halo acids or water solutions of lithium borohydrides, or alkaline water solutions of decaborane.

(9) An example of a fuel slug of the present invention and particularly an example of component (b) is as follows:

| (a) | (b) | (c) |
|---|---|---|
| Lithium | Boron (powder) or boron carbide or decaborane | Lithium hydride |
| 0-80% | 0-80% | 0-80% |

(10) Fuel slugs can be used where (a) can be magnesium or aluminum or any alloys of these with or without lithium: or phosphorus, sodium, potassium or their alloys or mixtures of all these. Also slugs can be used where component (b) can be any of the metals, organo metals or alloys, carbides or borides listed in paragraphs 1-4 above, or mixture of these. Also useful slugs can employ as component (c) phosphorous, or lithium or any of the hydrides listed in paragraph (7) (the mixture of powders being sintered at the fusion point of the binder).

(11) Especially adapted for use in the present invention are slugs made of lithium and/or lithium alloys with as a safe stable binder for the metal hydrides for any and all fuel and propellant compositions as above and especially to underwater, space and airborne vehicles for reaction with any and all oxidizers and fluorinating agents and especially for reaction with water and aqueous solutions of soluble oxidizers. Also in the fuel slugs, the elements sodium and potassium can be substituted or mixed with each other or with lithium as lower energy but more reactive binders for water reaction.

(12) The fuel slugs herein described provide improvement in specific impulse and density impulse over all other systems using similar fuel elements. The slugs are safe and their use provides reliable handling of hazardous toxic, pyrophoric and pyrogolic material with excellent performance, reliability and safety for marine transportation (submarines).

(13) Of advantage in the present invention is the use of lithium hydride in the fused or highly compressed 10–20 tons or more square inch as a binder for dispersions of all the metals listed including their alloys and especially the high melting point metals boron and boride and carbides listed. Permitting the resultant fuel slugs to be more readily burned synergistically with the hydride in air in ram-jets, in water, steam or other oxidizers in torpedoes or for reaction in all and any combustion chambers as listed in paragraphs 1, 2, 3, 4, 5 and 6.

(14) Another advantage obtained by the present invention is that the compositions including the propellant inserts (as hereinafter described in paragraph 21) can be used to induce pyrogolic and pyrophoric qualities and increase the ease of ignition and increase blow out velocities in all and any suitable rocket, ram-jet and turbo ram-jet engines for all and any applications. Thus, the combination of binder-insert can be as follows: lithium; hydrides; phosphorous; oxidizer.

(15) The present invention provides the cheapest, most efficient and safest methods of utilizing the high energy elements such as boron and the high density high energy explosive substances.

(16) Useful fuel slugs, as herein described, are manufactured by blending the materials finely ground and powdered in the dry state or suspended in an inert fluid and they are then extruded or pressed to shape and sintered (composition permitting) in accordance with powdered metallurgical practice in an inert atmosphere.

(17) Advantageously, usually dangerous to handle materials such as low temperature stability metal hydrides are mixed with finely divided lithium metal or metal or alloy mixtures and mechanically pressed to shape at room temperature and high pressure in inert atmosphere, the pressure being 10–20 tons per square inch or higher.

(18) In accordance with the present invention, the design of slugs of all shapes sizes and patterns for reaction "in situ" or injection can be made by a method in which the slug is pressed to the form of hollow sleeves or multicavity structures from the materials claimed above and where such sleeves or cavities are filled with loose or lightly pressed compounds or mixtures as above and sealed. Fuel slugs can be made thusly where the objective is to increase the total reactivity of the slug, or to increase the reactive surface area after ignition. Also, the above structures can be used to contain fuel compositions of poor mechanical strength for improved handling, or to contain hazardous toxic, pyrophoric, pyrogolic compositions for improved handling, and ignition, and the compositions set forth in paragraph 21 below.

(19) The fuel slugs can be used advantageously in applications where "in situ" reactive slugs can be supported structurally with non-reactive metal and plastic composition as containers.

(20) The slugs may be used where regenerative preheating liquid oxidizer of fluorinating coils can be embedded in the slug cavities as described in paragraph 18 for improvement of the "in situ" reaction operating efficiency.

(21) In accordance with the present invention the cavities can be surface coated with inert plastics and filled with all and any solid or semi-solid inorganic or organic oxidizers, fluorinating agents or mixtures for the purposes of paragraphs 12, 13, 14, 15 and 18 where the oxidizers can be any and all the inorganic perchlorates and nitrates and the stable organic perchlorates nitrates and nitro compounds and mixtures with stabilizers of the usual type.

(22) In accordance with the present invention another advantage is that the solid fuel lithium borohydride is soluble in water (20 parts per 100 parts 10° C. water) and that the substance can be placed in a cell in the combustion water line to the fuel compositions listed in paragraph 7 and where the reaction of the substance preheats the sea water and may be used to assist in producing steam in which powdered magneisum and aluminum suspended in lithium or lithium hydride may be burned directly, or the compositions listed.

(23) In accordance with the present invention, all the hydrides listed in the above claims and the free metals magnesium and lithium with varying proportions of the other metals can be burned directly in the steam, raised generatively in a boiler combined with the combustion chamber.

(24) Another advantage is that the above fuel mixtures may be used catalytically for decomposing hydrogen peroxide for any application and enable hydrogen peroxide to be used for starting combustion of all the compositions listed.

(25) Another advantage is that sleeves of these fuels can be inserted as combustion chamber liners in peroxide torpedo engines to utilize the oxygen and increase the torpedo range by a simple method.

(26) Another advantage is that the heat of decomposition of the hydrogen peroxide at the fuel feed plate is used for fuel fusion. The heat of combustion in other reactions, fuses the fuel for injection.

(27) In accordance with the present invention, useful slugs are those made with the metal lithium with or without other metal and/or hydride derivatives for the purpose of burning metals such as aluminum and boron in stream by the mechanism whereby the lithium or its mixtures produce reaction temperatures, and oxides and hydroxides resulting assist in oxidizing the combustion resistant metals by virtue of their high reactivity.

(28) Another advantage obtained is that the free hydrides can be used as loose or lightly pressed powders with or without dispersed lithium in chambers where the heat of hydrolysis is absorbed by coils embedded in the powders. These coils carry the water to be used for hydrolysis.

(29) Another advantage is cast pressed or extruded lithium hydride and other hydrides or the metals, carbides or borides and mixtures of these unbonded, can be pressed or extruded at 10–20 tons per squire inch or more and pressure fed into any and all combustion chamber at a single diametrically matched slug-injector orifice. On the feeding of these encased in a thin layer of fusible metal or metalloid composition at the single injection orifice. Or multiple rods of any suitable pattern (star or circular section) can be embedded in the fusible binder and pressure fed into the combustion chambers through injectors located to match the embedded fuel rods. The fuel slugs or rods may be of cast lithium hydride with or without included metals, alloy carbides or borides.

(30) Compressed rods or tubes of any style cross section made by simple pressure at 10–20 tons per square inch or more of lithium borohydride and the insertion of these in water-oxidizer lines just prior to the combustion chamber injectors for solution and reaction in the chamber as either a primary fuel source or as an ignition or combustion conditioning agent or both when used with any and all propellant systems. Also, the addition of 0.01 to 2% of the heavy metals such as chlorides or any other catalytic form in concentrations designed to produce decomposition rates suitable for the application can be made to rods.

(31) For the preparation and forming of the fuel materials herein discussed, the free metals, carbides, borides and/or hydrides where the materials are in finely divided form and suspended in lithium or lithium alloys of low melting point or in the highly compressed or fused and cast lithium hydride or other solid hydrides (see paragraph 29) can be used singly or as a mixture. Also, fuels can be used in which above fuel materials are lightly bound with the minimum of plastic or organic binders used in conventional propellant manufacture and especially polyurethanes and polyether and polyfluoro and nitro substituted urethanes for binding the hydrides since a percentage of the polymerizing multi-isocyanate can be added for dehydration of the liquid resin immediately before the hydrides are added during manufacture preventing decomposition of the hydrides. Also, these compositions may be prepared for insertion, with or without adhesion or mechanical interlocking into longitudinal or annular slots or grooves or cavities of any desired number, shape or cross sectional pattern but in general thin and deep designed into conventional solid propellant slugs, the object being to enable extensive quantities of these high energy and/or high density fuels to be incorporated in conventional fuel slugs to improve performance and where it is impractical to include the fuels directly in the slugs either due to the physical inability of the organic binder to bind the powdered fuels and the quantities of solid oxidizer required for complete combustion. Also, these fuels are advantageously used inasmuch as there ordinarily is great risk of chemical instability in storage, of accident in manufacture and of burning during operation to detonation in large propellant slugs. The burning propellant fuses and/or decomposes and/or vaporizes the exposed fuel insert surfaces and adequate mixing and combustion results in the gas stream during the transit to the nozzle. For alternate structure, longitudinal triangular section or disks 1 to 10 millimeters thick, of materials can be bonded or held mechanically together, and the cast solid or bound oxidizer can also be integrated in this manner.

(32) In accordance with the present invention, composite slugs can be burned if made as above with conventional binders containing the metals and/or carbides and/or borides and/or hydrides for the purposes as in paragraph 31 but where the propellant slug is under oxidized for the reasons given in paragraph 31 and where any and all liquid oxidizers, fluorinating agents or solution is injected at the upper end for the purpose of adding stoichiometric oxygen, being first used to regenerating cool the motor if required. It is also used to control combustion rate, starting and stopping the engine and thrust for various applications.

(33) Another advantage is that the fuel slugs can be used as under oxidized composite slugs where the object is to burn the environmental fluid: i.e.; large percentages of air in ram-jets or turbo ram-jets; or water in the marine vehicles such as torpedoes to increase range and performance and that all these composite slugs may be pressure injected for burning as previously described.

(34) Still another advantage is the use of these slugs as conventional propellant slugs of oxidizers and organic binder containing the metal and metalloid compositions dispersed and where the oxidizer is stoichiometric with the carbon (plastic binder) content or less and the object is to "after burn" in simple environmental fluids such as air and/or water as set forth in paragraphs 32 and 33 or with modified environmental fluids, aqueous solutions of compounds.

Having described the invention, what is claimed is:

1. A method of preparing a solid fuel comprising the steps of (1) mixing powdered lithium hydride particles with powdered high energy delivering metallic particles of the group consisting of magnesium, aluminum, a magnesium aluminum alloy, a magnesium lithium alloy, an aluminum lithium alloy and a magnesium aluminum lithium alloy (2) forming the mixture under pressure to a desired shape and (3) thereafter sintering the mixture to form a solid fuel slug in which one of the particles are dispersed and bound within a matrix of the other particles.

2. A method of burning a solid fuel slug in an engine system adapted for use in underwater propulsion, said method comprising mixing and burning a solid fuel slug comprising lithium hydride particles bound within a sintered matrix of a member of the group consisting of magnesium, aluminum, a magnesium aluminum alloy, a magnesium lithium alloy, an aluminum magnesium alloy and a magnesium aluminum lithium alloy with hydrogen peroxide.

3. A method of burning a solid fuel slug in a combustion chamber of an engine adapted for use in underwater propulsion, said method comprising (1) heating a fuel slug comprising (a) a plurality of fuel particles consisting of a member of the group consisting of a metal carbide and a metal hydride in which the metal is a member of the group consisting of lithium, aluminum, magnesium, boron, beryllium and mixtures thereof and (b) a lithium binder for said fuel particles, to a temperature above the melting point of lithium and below the melting point of said fuel particles, (2) feeding said fuel slug into said combustion chamber and (3) burning said slug with a liquid oxidizer.

4. A method of burning a solid fuel slug in a combustion chamber of an engine adapted for use in underwater propulsion, said method comprising (1) heating a fuel slug comprising (a) a plurality of fuel particles consisting of a member of the group consisting of a metal carbide and a metal hydride in which the metal is a member of the group consisting of lithium, aluminum, magnesium, boron, beryllium and mixtures thereof and (b) a lithium binder for said fuel particles, to a temperature above the melting point of lithium and below the melting point of said fuel particles, (2) feeding said fuel slug into said combustion chamber and (3) burning said slug with an aqueous solution of lithium perchlorate.

5. A method of burning a solid fuel slug in a combustion chamber of an engine adapted for use in underwater propulsion, said method comprising (1) heating a fuel slug comprising (a) a plurality of fuel particles consisting of a member of the group consisting of a metal carbide and a metal hydride in which the metal is a member of the group consisting of lithium, aluminum, magnesium, boron, beryllium and mixtures thereof and (b) a lithium binder for said fuel particles, to a temperature above the melting point of lithium and below the melting point of said fuel particles, (2) feeding said fuel slug into said combustion chamber and (3) burning said slug with nitric acid.

6. A method of burning a solid fuel slug in a combustion chamber of an engine adapted for use in underwater propulsion, said method comprising (1) heating a fuel slug comprising (a) a plurality of fuel particles consisting of a member of the group consisting of a metal carbide and a metal hydride in which the metal is a member of the group consisting of lithium, aluminum, magnesium, boron, beryllium and mixtures thereof and (b) a lithium binder for said fuel particles, to a temperature above the melting point of lithium and below the melting point of said fuel particles, (2) feeding said fuel slug into said combustion chamber and (3) burning said slug with water.

7. A method of burning a liquid oxidizer and the solid fuel comprising the steps of (1) dissolving lithium perchlorate in water to form an aqueous oxidizer solution, (2) injecting said aqueous solution into a combustion chamber having a solid fuel slug comprising finely divided metallic hydride particles dispersed in a lithium binder in which said particles comprise a hydried of an element of the group consisting of lithium, aluminum, magnesium, boron, beryllium and mixtures thereof, and (3) thereafter igniting and burning the oxidizer and fuel.

8. A method of burning a solid fuel slug in a torpedo engine system comprising mixing and burning a solid fuel slug comprising magnesium particles bound within a matrix of lithium with a conditioning agent comprising a solution of lithium perchlorate in water.

9. A method of burning a solid fuel slug in a torpedo engine system comprising mixing and burning a solid fuel slug comprising fuel particles bound within a matrix of lithium with a conditioning agent comprising a solution of lithium perchlorate in water in which the fuel particles are selected from a member of the group consisting of a metal hydride and a metal carbide, said metal being a member of the group consisting of lithium, aluminum, magnesium, boron, beryllium and mixtures thereof.

10. A method as defined in claim 9 in which said fuel particles are a metal hydride.

11. A method as defined in claim 9 in which said fuel particles are a metal carbide.

12. A method of burning a solid fuel slug in an engine system adapted for use in underwater propulsion, said method comprising mixing and burning a solid fuel slug comprising fuel particles bound within a matrix of lithium with water in which the fuel particles are selected from a member of the group consisting of a metal hydride and a metal carbide, said metal being a member of the group consisting of lithium, aluminum, magnesium, boron, beryllium and mixtures thereof.

13. A method of burning a solid fuel slug in an engine system adapted for use in underwater propulsion, said method comprising mixing and burning a solid fuel slug comprising fuel particles bound within a matrix of lithium with an aqueous solution of an inorganic perchlorate salt in which the fuel particles are selected from a member of the group consisting of a metal hydride and a metal carbide, said metal being a member of the group consisting of lithium, aluminum, magnesium, boron, beryllium and mixtures thereof.

14. A method of burning a solid fuel slug in a combustion chamber of an engine adapted for use in underwater propulsion, said method comprising (1) heating a fuel slug comprising (a) a plurality of lithium hydride fuel particles and (b) a lithium binder for said fuel particles, to a temperature above the melting point of lithium and below the melting point of said fuel particles, (2) feeding said fuel slug into said combustion chamber and (3) burning said slug with an aqueous solution of lithium perchlorate.

15. A solid fuel composition comprising (1) particles of a hydride of an element selected from a member of the group consisting of lithium, aluminum, magnesium, boron, beryllium and mixtures thereof, said hydride being dispersed in a sintered matrix of a high energy delivering fuel of the group consisting of magnesium, aluminum, a magnesium aluminum alloy, a magnesium lithium alloy, an aluminum magnesium alloy and a magnesium aluminum lithium alloy.

16. A solid fuel composition comprising (1) particles of lithium hydride dispersed in a sintered matrix of a high energy delivering fuel of the group consisting of magnesium, aluminum, a magnesium aluminum alloy, a magnesium lithium alloy, an aluminum magnesium alloy and a magnesium aluminum lithium alloy.

17. A solid fuel comprising about 10 to 20 parts by weight of a metallic binder comprising lithium, about 80 to 90 parts by weight of aluminum particles, and a plurality of lithium hydride particles dispersed in said binder.

18. A solid fuel comprising about 10 to 20 parts by weight of a binder comprising lithium and sulfur and about 80 to 90 parts by weight of aluminum particles.

19. A composition adapted for use as a solid fuel comprising about 10 to 20 parts by weight of a binder consisting essentially of sulfur and lithium and dispersed in said sulfur and lithium binder about 80 to 90 parts by weight of aluminum particles.

References Cited by the Examiner
UNITED STATES PATENTS

| | | |
|---|---|---|
| 1,506,322 | 8/24 | O'Neill. |
| 1,506,323 | 8/24 | O'Neill. |
| 2,461,797 | 2/49 | Zwicky _____ 60—35.4 |
| 2,477,549 | 7/49 | Van Loenen. |
| 2,530,491 | 11/50 | Van Loenen. |
| 2,530,493 | 11/50 | Van Loenen. |
| 2,744,380 | 5/56 | McMillan et al. _____ 60—35.4 |
| 2,746,133 | 5/56 | Lowe _____ 29—182.8 |
| 2,937,824 | 5/60 | Krumbholz et al. _____ 149—37 |

CARL D. QUARFORTH, Primary Examiner.

LEON D. ROSDOL, Examiner.